United States Patent [19]

Gall

[11] 3,903,042

[45] Sept. 2, 1975

[54] STABILIZED POLYALKYLENE TEREPHTHALATE RESIN COMPOSITION

[75] Inventor: John S. Gall, North Haledon, N.J.

[73] Assignee: Celanese Corporation, New York, N.Y.

[22] Filed: June 11, 1974

[21] Appl. No.: 478,207

[52] U.S. Cl............ 260/40 R; 260/857 PE; 260/860
[51] Int. Cl.² ........................................ C08L 67/02
[58] Field of Search............ 260/40 R, 857 PE, 860, 260/DIG. 35

[56] References Cited
UNITED STATES PATENTS

| | | | |
|---|---|---|---|
| 3,639,331 | 2/1972 | Hattori et al.................. | 260/40 R X |
| 3,812,077 | 5/1974 | Hobbs.............................. | 260/40 R |
| 3,814,725 | 6/1974 | Zimmerman et al............. | 260/40 R |

*Primary Examiner*—Melvyn I. Marquis
*Assistant Examiner*—S. M. Person
*Attorney, Agent, or Firm*—Thomas J. Morgan; Linn I. Grim; Marvin Bressler

[57] ABSTRACT

A stabilized polyalkylene terephthalate resin composition is disclosed. The polyalkylene terephthalate resin composition comprises a polyalkylene terephthalate resin selected from the group consisting of polypropylene terephthalate and polybutylene terephthalate, 2 to 60 percent of the total composition of a reinforcing filler and up to below 1 percent by weight of the total composition of a polyamide, preferably polycaprolactam. The composition retains a higher degree of tensile strength after high temperature long-term aging than does any polyalkylene terephthalate composition of the prior art.

8 Claims, No Drawings

STABILIZED POLYALKYLENE TEREPHTHALATE RESIN COMPOSITION

BACKGROUND OF THE DISCLOSURE

1. Field of the Invention

The instant invention is directed to a heat stabilized molding resin. More specifically, the instant invention is directed to a heat stabilized polyalkylene terephthalate resin composition. Still more specifically, the instant invention is directed to a heat stabilized polyalkylene terephthalate composition consisting of a polyalkylene terephthalate resin, a reinforcing filler and a polyamide resin.

2. Description of the Prior Art

The surprisingly superior results attainable by employing a polyalkylene terephthalate resin selected from the group consisting of polypropylene terephthalate and polybutylene terephthalate as a molding resin has recently been recognized in the art. These superior results include improved moldability as well as improved properties of the polyalkylene terephthalate molded article.

As is well known in the art, polypropylene terephthalate and polybutylene terephthalate can be molded and otherwise processed at lower temperatures and have a significantly shorter cycle time in the mold than other engineering resins, such as polyethylene terephthalate. More importantly, these resins do not require, as does polyethylene terephthalate, the presence of a nucleating agent to induce crystallinity. It has recently been discovered that nucleating agents and/or internal mold release agents when added to polypropylene terephthalate or polybutylene terephthalate molding resins cause a marked decrease in surface quality, i.e., the glossy surface finished on products molded therefrom is rendered rough, streaky and uneven. Thus, polypropylene terephthalate and polybutylene terephthalate molding resins, which were first disclosed, along with polyethylene terephthalate in U.S. Pat. No. 2,465,319 to Whinfield and Dickson, free of nucleating agents and/or internal mold release additives have been found to solve mold processing problems long associated with polyethylene terephthalate and believed, by those skilled in the art, to be equally associated with all polyalkylene terephthalates.

The other area of superior results attained by polypropylene terephthalate and polybutylene terephthalate compared to molding resins of the prior art, and especially polyethylene terephthalate, is the noticeably improved performance properties of the molded articles made of these resins. For example, reinforced polybutylene terephthalate resins although possessing equivalent strength compared to an equivalent reinforced polyethylene terephthalate resin has substantially higher toughness, lower water absorption, better creep properties and more desirable color properties than does an equivalently filled polyethylene terephthalate resin.

The above improved results attained with reinforced polypropylene terephthalate and polybutylene terephthalate compared to equivalent molding resins of the prior art as exemplified by polyethylene terephthalate explain the recent explosive growth in the use of these thermoplastic polyesters, A fundamental property necessary to further expansion in the utilization of these resins is tensile strength retention after long term exposure to high temperatures. This property is fundamental to the utilization of polypropylene terephthalate and polybutylene terephthalate in many applications requiring high strength properties.

Certain molded articles not only require high tensile strength but furthermore require that the molded article retain its strength even under long exposure to high temperatures. As those skilled in the art are aware, thermoplastic molding resins in general lose a considerable percentage of their tensile strength when exposed to high temperature over extended periods of time. This is true of polypropylene terephthalate and polybutylene terephthalate. Thus, although the addition of reinforcing fillers raise the tensile strength of these resins to a point where they become utilizable as engineering resins, still the problem of high temperature stability limits their utilization and bars their use in many important applications. For instance, there are many articles disposed under the hood of automobiles, which when fabricated of polypropylene terephthalate or polybutylene terephthalate represent an advance over the materials of construction currently employed. An example of such an article is a distributor cap. A distributor cap molded of glass reinforced polybutylene terephthalate has superior electrical properties compared to the thermoset distributor caps of the prior art. However, a problem associated with a glass reinforced polybutylene terephthalate distributor cap lies in the loss of tensile strength with time due to the high temperatures existing under the automobile hood.

The problem of heat stabilization of polypropylene terephthalate and polybutylene terephthalate has already been considered in the prior art. U.S. Pat. No. 3,801,530 to Freed represents an advance in this art. Freed discovered that the use of a substituted or unsubstituted alkylene bis fatty acid amide in combination with polypropylene terephthalate or polybutylene terephthalate stabilized the tensile strength of these filled thermoplastic polyesters after long exposure to high temperature. However, although this discovery represents a significant advance in the art, still there is further room for improvement in that there is still a significant drop off in tensile strength of these filled polypropylene terephthalate and polybutylene terephthalates after long term exposure to elevated temperatures.

SUMMARY OF THE INVENTION

The present invention is directed to a polyalkylene terephthalate resin composition which overcomes the disadvantages of the polyalkylene terephthalate resin compositions of the prior art. That is, the polyalkylene terephthalate resin composition of the present invention has increased high temperature tensile strength stability compared to the resin compositions of the prior art.

In accordance with the instant invention a polyalkylene terephthalate resin composition which consists of the group consisting of polypropylene terephthalate and polybutylene terephthalate includes polypropylene terephthalate or polybutylene terephthalate in combination with a reinforcing filler which comprises about 2 to 60 weight percent of the total composition and up to below 1 percent by weight of the total composition of a polyamide.

DETAILED DESCRIPTION

The base of the resins of this invention is a polyalkylene terephthalate polymer selected from the group consisting of polypropylene terephthalate and polybutylene terephthalate. These polymers which are the general type described in U.S. Pat. No. 2,465,319 to Whinfield and Dickson, can be produced from the reaction product of a dibasic acid, such as terephthalic acid or a dialkyl ester of terephthalic acid (especially dimethyl terephthalate), and diols having 3 and 4 carbon atoms. Suitable diols include 1,3-propanediol, 1,4-butanediol, 1,3-butanediol, 1,2-propanediol, 1,2-butanediol, 2,3-butanediol and the like.

In the production of the polymers used in this invention, i.e., polypropylene or polybutylene terephthalate, the appropriate bis-(hydroxyalkyl) terephthalate is produced as the intermediate. The bis-(hydroxyalkyl) terephthalate can be prepared by reacting the dialkyl ester of terephthalic acid in which the alkyl radicals can contain from 1 to 7 carbon atoms with about two molecular proportions of the diols described above.

The reaction for the esterification is conducted under conditions of elevated temperatures and atmospheric, subatmospheric or superatmospheric pressure. Normally, the desired temperatures of the reaction can range from about the boiling temperature of the reaction mixture to as high as 250°C., if desired.

After the polymer base is prepared, other additives for appearance and property improvements can be incorporated into the molding resins of this invention such as colorants, hardeners, flame retardants, reinforcing agents and the like by intimately blending by either dry blending or melt blending, blending in extruders, heater rolls or other types of mixtures.

The range of intrinsic viscosity of the polypropylene terephthalate and polybutylene terephthalate molding resins of this invention is between about 0.4 and 1.5 deciliters per gram. More preferably, the intrinsic viscosity is in the range of between about 0.65 and 1.4 deciliters per gram, as measured in an 8 percent solution, based on the polymer weight, of orthochlorophenol at 25°C.

The improved polypropylene terephthalate or polybutylene terephthalate resin composition of this invention includes a reinforcing filler. The reinforcing filler, in one preferred embodiment, is blended with the polymer. In another preferred embodiment, the reinforcing filler is charged into the polymerization reaction with the monomers. This latter preferred embodiment is employed only in those cases where the polymerization reaction is not affected by the presence of the reinforcing filler. A preferred reinforcing filler is glass fibers which may be introduced into the composition as chopped or continuous rovings. Other preferred fillers include asbestos fibers, talc, calcium silicate, cellulosic fibers, cotton fabric paper, synthetic fibers, metallic powders and the like. The amount of reinforcing filler ranges between about 2 and 60 weight percent of the total composition. More preferably, the amount of reinforcing filler is in the range of between about 5 and 50 weight percent of the total composition.

As mentioned above, the present invention is directed to an improved class of stabilized polyalkylene terephthalate resin compositions. Specifically, the compositions of this invention impart stabilized tensile strength properties to articles formed from these compositions after long exposure to high heat levels. In order to provide this property, up to below 1 percent, measured as a weight percent of the total composition, of a polyamide resin is provided. More preferably, the polyamide additive is present in the range of between about more than 0.25 weight percent to less than 1 weight percent, based on the total weight of the resin composition. In a preferred embodiment the polyamide employed is polycaprolactam, commonly designated as nylon 6. In another preferred embodiment the polyamide is the polycondensation product of hexamethylene diamine and sebacic acid, commonly designated as nylon 6,10. In still another preferred embodiment, the polyamide employed is the polycondensation product of hexamethylene diamine and dodecanoic acid, commonly designated as nylon 6,12.

Other additives, such as flame retardants and the like may also be added to the composition of this invention.

The following examples are given to illustrate the polypropylene terephthalate and polybutylene terephthalate resin compositions of this invention. It should be appreciated that these examples are given for illustrative purposes only and should not be construed as limiting the invention thereto.

EXAMPLE I 1,200 grams of diethyl terephthalate and 900 grams of 1,4-butanediol are mixed together with an appropriate catalyst as described in the Whinfield and Dickson patent. U.S. Pat. No. 2,465,319, such as zinc acetate-antimony trioxide or lead oxide-zinc oxide. The temperature is increased to approximately 200°C. when 80 percent by weight of the methanol has been removed. Vacuum is applied and the temperature is raised to 240°–250°C. The vacuum is broken when the intrinsic viscosity has reached 0.75 dl/g. and the resultant polymer is discharged and chipped. The polymer is added to ⅛-inch glass fibers. The glass fibers are present in an amount such that the final resin composition contains 30 percent by weight of this reinforcing filler based on the weight of the total composition. The glass fibers are tumble blended for one minute into the polybutylene terephthalate chip and then extrusion blended by force feeding through a 1-inch single screw extruder with a standard die. The temperatures of the extruder and die range from 500° to 510°F. The strands are grounded in the milling type mixer to pass through a large screen (4 mesh or smaller).

The extruded fiberglass reinforced polybutylene terephthalate polymer is formed into Type I tensile bars. The Type I tensile bars were produced on a stokes screw injection machine under the following molding conditions:

| | |
|---|---|
| Nozzle | 510°C. |
| Barrel Cylinders | 500°F. |
| Melt Temperature | 500°F |
| Mold Temperature | 150°F. |
| Injection (hydraulic) Pressure | 1500 psi. |
| Injection Cushion | ¼ inch |
| Screw Speed | 80 rpm. |
| Cycle | |
| Injection | 10 seconds |
| Hold | 15 seconds |
| Delay | 2 seconds |

EXAMPLE II

A polybutylene terephthalate melt containing 30 percent by weight of ⅛-inch glass fibers is prepared as described in Example I. In this batch, however, along with the glass fibers, one percent by weight, based on the weight of the total composition, of nylon 6 (polycaprolactam) pellets is added. The addition of the nylon pellets occurs simultaneously with the addition of the glass fibers. It is emphasized, however, that the nylon may be added prior or subsequent to the addition of the glass fibers. The batch containing 1 percent by weight of the nylon pellets is fabricated into Type I tensile bars in accordance with the procedure enumerated in Example I.

EXAMPLE III

A batch of polybutylene terephthalate resin is prepared in accordance with the procedure enumerated in Example I. However, in this batch along with the 30 percent by weight of glass fibers is added 0.25 percent by weight of the total composition of N,N'-hexamethylene bis(3,5-di-tert-butyl-4-hydroxy-hydrocinnamamide). The batch is thereafter formed, in accordance with the procedure enumerated in Example I, into Type I tensile bars.

EXAMPLES IV—VI

The Type I tensile bars formed in accordance with the procedure enumerated in Examples I–III are tested in accordance with the procedure enumerated in ASTM D-638-68 to determine their tensile strength. At the same time, 18 bars representing 6 bars each made in accordance with each of Examples I, II and III, are placed in an oven maintained at a temperature of 185°C.

Three bars, one bar taken from each of the formulations described in Examples I–III are removed from the oven after aging for 1 week, 2 weeks, 4 weeks, 8 weeks, 12 weeks and 16 weeks. After removal from the oven each of the bars are tested in accordance with the same procedure (ASTM D-638-68) used to determine the tensile strength of the three bars tested immediately after fabrication. The results of this test are tabulated below in Table I.

when 0.25 percent by weight of N,N'-hexamethylene bis(3,5-di-tert-butyl-4-hydroxy-hydrocinnamamide) was added. This compound, a substituted alkylene bis fatty acid amide, is representative of the class of compounds disclosed in U.S. Pat. No. 33,801,530. It is seen that this compound, although representing a distinct improvement in heat stability over an unstabilized glass filled polybutylene terephthalate, decreases in tensile strength to half its original value between the 12th and 16th week of exposure to high temperature heating. It is noted that the percentage by weight of the alkylene bis fatty acid amide is well within the range usually employed for stabilizers, 0.25 percent. Thus, this composition is a representative sample of the type of composition disclosed in U.S. Pat. No. 3,801,530.

Turning now to the results attained by the claimed composition, the 1 percent by weight filled polycaprolactam, it is seen that even after 16 weeks the tensile bars produced with 1 percent by weight of polycaprolactam have not yet decreased in tensile strength to one-half the original value. It is thus seen that the employment of a polyamide represents an advance over the prior art teachings.

EXAMPLES VII–XI

Another batch of glass filled polybutylene terephthalate is produced in accordance with the procedure enumerated in Example I. That is, an unstabilized, glass filled polybutylene terephthalate polymeric mass is produced. In addition, four additional batches containing 0.25 percent, 0.50 percent, 0.75 percent and 1.0 percent by weight of polycaprolactam (nylon 6) is produced. The five batches are molded into Type I tensile bars in accordance with the above (Example I) described procedure. The five tensile bars are tested to determine tensile strength, again in accordance with the procedure enumerated in ASTM D-638-68. Additional Type I tensile specimens are then placed in an oven maintained at 185°C. and one such specimen from each formulation is taken out at periodic inter-

TABLE I

TENSILE STRENGTH OF PBT FILLED BARS, psi

| When Tested | Example I - No Stabilizer Added | Example II - 1% Polycaprolactam Added | Example III - 0.25% N,N'-hexamethylene bis(3,5-di-tert-butyl-4-hydroxy-hydrocinnamamide) |
|---|---|---|---|
| Unaged (0 weeks) | 18,600 | 17,700 | 18,900 |
| After 1 wk aging | 19,900 | 21,000 | 20,000 |
| After 2 wks aging | 19,000 | 20,900 | 19,900 |
| After 4 wks aging | 13,300 | 20,000 | 15,900 |
| After 8 wks aging | 10,300 | 17,200 | 12,900 |
| After 12 wks aging | 8,500 | 14,100 | 10,500 |
| After 16 wks aging | 7,500 | 12,300 | 8,900 |

The results tabulated in Table I are commonly evaluated by determining the number of weeks required for the tensile strength to be reduced by 50 percent. This gives an excellent indication of the long term stability of the polyalkylene terephthalate resin to high heat exposure. Obviously, the control bars, that is, the bars in which no stabilizer was added to the glass filled polybutylene terephthalate have the most rapid drop off in tensile strength. In the period between the 8th and 12th week the tensile strength dropped below half of its original strength. A noticeable improvement occurred vals. This test is now 4 weeks old and the results up to this time are tabulated in Table II which appears below.

TABLE II

| | Nylon 6 in Polybutylene Terephthalate | | | | |
|---|---|---|---|---|---|
| Time | 0.25% Nylon 6 | .50% Nylon 6 | .75% Nylon 6 | 1% Nylon 6 | No Nylon 6 Control |
| Start | 13,600 | 14,400 | 14,500 | 13,900 | 13,200 |
| 1 wk | 15,300 | 16,300 | 17,000 | 16,200 | 14,700 |
| 2 wks | 15,500 | 16,400 | 17,800 | 16,600 | 12,000 |
| 4 wks | 10,600 | 12,600 | 13,100 | 12,700 | 9,200 |

Because of the incompleteness of this test none of the samples currently have a tensile strength as low as one-half of the original tensile strength. However, certain results can be gleamed from this data. The most obvious observation is the marked decrease in tensile strength of the control sample compared to the stabilized samples. The control sample has decreased, in tensile strength, 30 percent compared to the original tensile strength before heat aging. Another interesting observation is the decrease in tensile strength in the 0.25 percent by weight nylon 6 samples. After 4 weeks this sample has decreased in tensile strength by 23 percent. This concentration, although an improvement in the art, is not the most preferred embodiment of this invention. On the other hand, when 0.5 percent by weight of the nylon 6 stabilizer is added the decrease in tensile strength after 4 weeks is only 13 percent. Even more impressive is the result obtained at 0.75 percent and 1.0 percent by weight. In these samples the decrease in tensile strength is 10 and 9 percent respectively. These results indicate that the optimum percentage of the polyamide added for stabilizer purposes is optimized in the range of above 0.25 percent by weight and 1 percent by weight.

It is noted that a recent disclosure, Netherlands patent application No. 7213315, published Apr. 3, 1973 makes a broad disclosure directed to a reinforced thermoplastic mixture containing 1 to 99 weight percent of a high molecular weight crystalline polyester, which includes polybutylene terephthalate, 99 to 1 percent by weight of a high molecular weight polymer and a reinforcing amount of a reinforcing material. Among the polymeric materials enumerated for use with the polyester is polyamide resins. It is noted that a very large number of polymeric materials is included in the list of polymeric materials which may be incorporated with the rapidly crystallizing polyester material.

It is emphasized that the addition of a reasonable low percentage within the preferred range of the polymer of this reference, that is, a percentage as low as 5 percent by weight, represents a percentage that could have a counter-productive effect on the property for which unexpected results have been shown above. It is well known in the art that polyamides in concentrations of 5 percent or more readily absorb water. Adsorption of water by a polymeric composition usually results in decreased tensile strength. Obviously, the longer a material is exposed, at whatever temperature, to normal atmospheric conditions the greater the degree of adsorption. Thus, this reference is not a teaching of the instant invention below 1 percent by weight concentration. The data above indicates that excellent results are attainable below 1 percent by weight of a polyamide.

It is furthermore emphasized that none of the recited polymers, other than polyamides, which are alleged to all produce the same result in Netherlands patent application No. 7213315, produce the improved heat stabilization result attained with the use of a polyamide.

The above preferred embodiments and examples illustrate the scope and spirit of the instant invention. These embodiments and examples will make apparent, to those skilled in the art, other embodiments and examples within the scope of the instant invention. The instant invention should therefore be limited only by the appended claims which follow.

What is claimed is:

1. A stabilized polyalkylene terephthalate resin composition comprising:

a polyalkylene terephthalate selected from the group consisting of polypropylene terephthalate and polybutylene terephthalate, said polyalkylene terephthalate having an intrinsic viscosity in the range of between about 0.4 and 1.5 deciliters per gram, as measured in an 8 percent solution, based on the polymer weight, of ortho-chlorophenol at 25°C.;

a reinforcing filler; and a polyamide, present in a concentration of more than 0.25 percent by weight and less than 1 percent by weight, based on the total weight of the composition, said polyamide selected from the group consisting of polycaprolactam, the polycondensation product of hexamethylene diamine and sebacic acid, and the polycondensation product of hexamethylene diamine and dodecanoic acid.

2. A composition in accordance with claim 1 wherein said polyamide is polycaprolactam.

3. A composition in accordance with claim 1 wherein said polyamide is the polycondensation product of hexamethylene diamine and sebacic acid.

4. A composition in accordance with claim 1 wherein said polyamide is the polycondensation product of hexamethylene diamine and dodecanoic acid.

5. A composition in accordance with claim 1 wherein said reinforcing filler is glass fibers.

6. A composition in accordance with claim 5 wherein said glass fibers are present in a concentration in the range of between about 2 and 60 percent by weight, based on the total weight of the composition.

7. A composition in accordance with claim 1 wherein said polyalkylene terephthalate is polybutylene terephthalate.

8. A composition in accordance with claim 1 wherein said polyamides are introduced into said resin composition as pellets.

* * * * *